(12) United States Patent
Michiels (10) Patent No.: US 10,243,937 B2
(45) Date of Patent: Mar. 26, 2019

(54) EQUALITY CHECK IMPLEMENTED WITH SECRET SHARING

(71) Applicant: NXP B.V., Eindhoven (NL)

(72) Inventor: Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 321 days.

(21) Appl. No.: 15/205,953

(22) Filed: Jul. 8, 2016

(65) Prior Publication Data

US 2018/0013736 A1    Jan. 11, 2018

(51) Int. Cl.
*H04L 9/00* (2006.01)
*H04L 9/08* (2006.01)
*H04L 29/06* (2006.01)

(52) U.S. Cl.
CPC ............ *H04L 63/061* (2013.01); *H04L 9/003* (2013.01); *H04L 9/085* (2013.01); *H04L 2209/16* (2013.01)

(58) Field of Classification Search
None
See application file for complete search history.

(56) References Cited

U.S. PATENT DOCUMENTS

| | | | | |
|---|---|---|---|---|
| 6,668,325 | B1* | 12/2003 | Collberg | G06F 21/14 713/194 |
| 7,848,515 | B2* | 12/2010 | Dupaquis | H04L 9/0625 380/255 |
| 8,817,975 | B2* | 8/2014 | Fujisaki | H04L 9/003 380/277 |
| 9,875,377 | B2* | 1/2018 | Melzani | G06F 21/72 |
| 9,906,360 | B2* | 2/2018 | Johnson | G06F 21/14 |
| 2001/0042210 | A1* | 11/2001 | Blaker | G06F 7/728 713/190 |

(Continued)

OTHER PUBLICATIONS

A Unified Framework for the Analysis of Side-Channel Key Recovery Attacks 2009 (Standaert) (Year: 2009).*

(Continued)

*Primary Examiner* — Sharon S Lynch (57) ABSTRACT

A method of performing an equality check in a secure system, including: receiving an input v having a known input property; splitting the input v into t secret shares $v_i$ where i is an integer index and t is greater than 1; splitting an input x into k secret shares $x_i$ where i is an integer index and k is greater than 1; splitting the secret shares $x_i$ into a s chunks resulting in s·k chunks $y_j$ where j is an integer index; calculating a mapping chain t times for each secret share $v_i$, wherein the mapping chain including s·k affine mappings $F_j$, wherein $y_j$ and $F_{j-1}(y_{j-1})$ are the inputs to $F_j$ and the $F_0(y_0)=v_i$; and determining if the outputs have a known output property indicating that the input x equals a desired value.

18 Claims, 2 Drawing Sheets

(56) References Cited

U.S. PATENT DOCUMENTS

| | | | |
|---|---|---|---|
| 2002/0075946 A1* | 6/2002 | Seo | H04B 1/712 375/148 |
| 2003/0044003 A1 | 3/2003 | Chari et al. | |
| 2003/0048903 A1* | 3/2003 | Ito | H04L 9/003 380/263 |
| 2003/0184553 A1* | 10/2003 | Dawson | G06T 15/503 345/581 |
| 2004/0139340 A1* | 7/2004 | Johnson | G06F 21/14 713/194 |
| 2004/0225705 A1* | 11/2004 | Rumynin | G06F 7/5336 708/620 |
| 2005/0166191 A1* | 7/2005 | Kandanchatha | G06F 21/14 717/137 |
| 2005/0169462 A1* | 8/2005 | Jung | G06F 7/725 380/28 |
| 2006/0034524 A1* | 2/2006 | Kitamura | H04N 19/593 382/232 |
| 2006/0140401 A1* | 6/2006 | Johnson | G06F 21/14 380/44 |
| 2006/0200514 A1* | 9/2006 | Fischer | G06F 7/38 708/446 |
| 2007/0014394 A1* | 1/2007 | Harder | G06F 21/12 380/28 |
| 2007/0140478 A1* | 6/2007 | Komano | H04L 9/003 380/28 |
| 2008/0208560 A1* | 8/2008 | Johnson | G06F 21/14 703/22 |
| 2009/0086976 A1* | 4/2009 | Scian | H04L 9/003 380/277 |
| 2009/0113217 A1* | 4/2009 | Dolgunov | G06F 12/1408 713/190 |
| 2010/0027781 A1* | 2/2010 | Galbi | H04L 9/0625 380/29 |
| 2010/0177887 A1* | 7/2010 | Ciet | G06F 7/728 380/28 |
| 2011/0055591 A1* | 3/2011 | Rivain | H04L 9/003 713/189 |
| 2011/0268266 A1* | 11/2011 | Fujisaki | H04L 9/003 380/28 |
| 2012/0002807 A1* | 1/2012 | Michiels | H04L 9/002 380/28 |
| 2014/0098951 A1* | 4/2014 | Choi | H04L 9/003 380/28 |
| 2014/0169553 A1* | 6/2014 | Chen | G06F 7/724 380/28 |
| 2015/0067441 A1* | 3/2015 | Gorissen | G06F 7/544 714/759 |
| 2015/0067875 A1* | 3/2015 | Johnson | G06F 21/14 726/26 |
| 2015/0270949 A1* | 9/2015 | Michiels | H04L 9/14 380/28 |
| 2015/0312039 A1* | 10/2015 | Michiels | H04L 9/3231 713/186 |
| 2016/0004591 A1* | 1/2016 | Duplys | G06F 21/75 714/777 |
| 2016/0050065 A1* | 2/2016 | Michiels | H04L 9/0631 380/28 |
| 2016/0056955 A1* | 2/2016 | Duplys | H04L 9/002 380/29 |
| 2016/0078250 A1* | 3/2016 | Michiels | H04L 9/0631 713/189 |
| 2016/0239647 A1* | 8/2016 | Johnson | G06F 21/14 |
| 2016/0269175 A1* | 9/2016 | Cammarota | G09C 1/00 |
| 2016/0328539 A1* | 11/2016 | Hoogerbrugge | G06F 21/14 |
| 2016/0330019 A1* | 11/2016 | Michiels | H04L 9/0631 |

OTHER PUBLICATIONS

Masking against Side-Channel Attacks 2013 (Prouff) (Year: 2013).*

Side Channel Cryptanalysis of a Higher Order Masking Scheme 2007 (Coron) (Year: 2007).*

Affine Masking against Higher-Order Side Channel Analysis, 2011 (Fumaroli). (Year: 2011).*

Nikova, Svetla et al., Threshold Implementations Against Side-Channel Attacks and Glitches, Dept. of Electrical Engineering, ESAT/COSIC, Katholieke Universiteit Leuven, Belgium; and Institute for Applied Information Processing and Communications, Graz Univ., ICICS Proceedings, pp. 529-549 (Dec. 4, 2006).

Schwabe, Peter, "Eliminating Timing Side-Channels. A Tutorial," (URL: https://cryptojedi.org/peter/data/shmoocon-20150118.pdf), 77 pages, Jan. 18, 2015.

* cited by examiner

EQUALITY CHECK IMPLEMENTED WITH SECRET SHARING

TECHNICAL FIELD

Various exemplary embodiments disclosed herein relate generally to securely implementing an equality check using secret sharing

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

Both software implementation and hardware implementations (i.e., grey-box implementations that use a secure processor of some sort but are subject to side channel attacks) of a cryptographic algorithm are subject to so called side channel attacks. Such attacks may analyze various properties of the cryptographic system during operation in order to extract secret key information used by the cryptographic system.

SUMMARY

A brief summary of various exemplary embodiments is presented below. Some simplifications and omissions may be made in the following summary, which is intended to highlight and introduce some aspects of the various exemplary embodiments, but not to limit the scope of the inven- Various exemplary embodiments relate to a method of performing an equality check in a secure system, including: receiving an input v having a known input property; splitting the input v into t secret shares $v_i$ where i is an integer index and t is greater than 1; splitting an input x into k secret shares $x_i$ where i is an integer index and k is greater than 1; splitting the secret shares $x_i$ into a s chunks resulting in s·k chunks $y_j$ where j is an integer index; calculating a mapping chain t times for each secret share $v_i$, wherein the mapping chain including s·k affine mappings $F_j$, wherein $y_j$ and $F_{j-1}(y_{j-1})$ are the inputs to $F_j$ and the $F_0(y_0)=v_i$; and determining if the outputs have a known output property indicating that the input x equals a desired value.

Further various exemplary embodiments relate to a non-transitory machine-readable storage medium encoded with instructions for performing an equality check by a secure system, the non-transitory machine-readable storage medium, including: instructions for receiving an input v having a known input property; instructions for splitting the input v into t secret shares $v_i$ where i is an integer index and t is greater than 1; instructions for splitting an input x into k secret shares $x_i$ where i is an integer index and k is greater than 1; instructions for splitting the secret shares $x_i$ into a s chunks resulting in s·k chunks $y_j$ where j is an integer index; instructions for calculating a mapping chain t times for each secret share $v_i$, wherein the mapping chain including s·k affine mappings $F_j$, wherein $y_j$ and $F_{j-1}(y_{j-1})$ are the inputs to $F_j$ and the $F_0(y_0)=v_i$; and instructions for determining if the outputs have a known output property indicating that the input x equals a desired value.

Various embodiments are described wherein the desired value is a constant.

Various embodiments are described wherein the input v is split such that $v=\oplus_i v_i$.

Various embodiments are described wherein the affine mappings $F_j$ are linear mappings.

Various embodiments are described wherein the known input property is that the input v in binary form has a 1 at a first specific bit location.

Various embodiments are described wherein the known output property is that the combined output in binary form has a 1 at a second specific bit location.

Various embodiments are described wherein the affine mappings $F_j$ are swap functions that swap the positions of two bits.

Various embodiments are described wherein the secure system is a white-box cryptographic system.

Various embodiments are described wherein the white-box cryptographic system is implemented using obfuscated lookup tables.

Various embodiments are described wherein the secure system is a grey-box cryptographic system.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A powerful attack technique to extract a secret, such as a key, from a hardware or software implementation of a cryptographic function is as follows. A hypothesis on a part of a secret is formulated and compared to an actual execution of the implementation of the cryptographic function with a reference implementation based on the hypothesis. If the hypothesis is correct, then this will be discernable. Differential power analysis (DPA) and correlation power analysis (CPA) are examples of such an attack, where the comparison is made based on power traces. A well-known countermeasure for such attacks is XOR-based masking. Although this works well for linear functions, it is not obvious how to use it for non-linear functions. The embodiments described herein illustrate how XOR-based masking may be used for a non-linear equality check.

Often, a device is to be protected from an attacker that tries to extract valuable information from it. This information can, for instance, be a key, a password, or a proprietary algorithm. The extent to which an attacker has access to the device is specified by the attack model. In the black-box attack model, an attacker has only access to the input-output behavior of the device. If, in addition, the attacker has access to side-channel information of the computations performed on the device, attack model is referred to as being grey-box. In the most extreme case, an attacker has full access to and full control over the execution environment. This is the white-box attack model. This embodiments described herein relates to building secure implementations for both the white-box attack model and for the grey-box attack model.

A powerful technique for extracting information from an implementation is (1) to make a guess on anything related to the implementation, (2) to translate this guess into the value v of an intermediate result x, and (3) to determine the likeliness that the guess was correct by determining the likeliness that an actual execution also satisfies x=v (although this value need not be calculated explicitly).

This technique is for instance used in Correlation Power Analysis (CPA) attacks on cryptographic implementations. In these attacks, first a guess is made of a part of the cryptographic key. For this guess, it is determined what this means for, for instance, the Hamming weight of some intermediate result $x_p$ for different plaintexts p. This Hamming weight is subsequently correlated with the power consumption seen in actual executions for these plaintexts at different times. The guesses with the highest correlations are good candidates for being the correct guess. In case an attacker has white-box access, the attack can be strengthened so that an adversary searches for a correlation between $x_p$ and intermediate results for the different plaintexts p in an actual execution.

In the embodiments described herein, an attack that is based on the described technique is described as a first-order Differential Relation Analysis (DRA) attack. This term abstracts from the precise information that is in the traces (power, memory addresses, ... ). The term first-order relates to the property that the attack only considers a single intermediate result in the actual implementation.

A known strategy to protect against DRA attacks is secret sharing. In secret sharing intermediate results are split into multiple shares. This strategy is, for instance, employed by masking where an intermediate value v is concealed by XORing it with a secret mask m. That is, value v is represented by the two shares $v_m = v \oplus m$ and m. If a function $f$ is linear with respect to the XOR-operation, then 2 shares that represent $f(v)$ are given by $f(v_m)$ and $f(m)$ since $f(v)=f(v_m \oplus m)=f(v_m) \oplus f(m)$.

Although the masking approach works well in combination with linear operations, it is more problematic for non-linear operations. Threshold implementations are an example where XOR-based secret sharing is combined with non-linear functions.

The embodiments described herein describe an approach for computing the non-linear Boolean expression x=0 via XOR-based secret sharing. That is, from the s shares $x_0, \ldots, x_{s-1}$ that XOR to x, t shares (bits in this case) $b_0, \ldots, b_{t-1}$ that XOR to $b \equiv (x=0)$ are computed. This is done in such a way so the implementation is resistant to at least first order DRA attacks.

The approach is, for instance, useful to securely implement AES with multiplicative masking, where the case of 0-input bytes are to be handled differently (see, for instance, U.S. patent application Ser. No. 14/484,925). Furthermore, it is noted that the invention equally applies to the check x=y since this is equivalent to $x \oplus y = 0$.

XOR-based secret sharing is an effective way to protect against DRA attacks. This method works particularly well in combination with a linear function. For non-linear functions, XOR-based secret sharing does not work straightforwardly. The embodiments herein describe how XOR-based secret sharing may be applied to the computation of a Boolean expression x=0.

First, some notation is defined. Let x be defined by the s shares $x_0, \ldots, x_{s-1}$. That is, $x=x_0 \oplus \ldots \oplus x_{s-1}$. Furthermore, let the shares be partitioned into a number of chunks. Without loss of generality, it may be assumed that the number of chunks is the same for each share (otherwise, the share may be split them until the numbers become equal). As a result, a share $x_i$ may be a describe as a list of its chunks as follows: $x_i = x_{i,0}, x_{i,1}, \ldots, x_{i,k-1}$). $D_j$ is defined as the domain of chunk j. That is, $x_{i,j} \in D_j$. Typically, $D_j$ contains all bit strings of a certain length.

The embodiment may be described in three parts. First, the set-up is described. Next, the embodiments usage is described. Finally, a specific implementation of the embodiment is shown.

Set-Up

Figure 1:
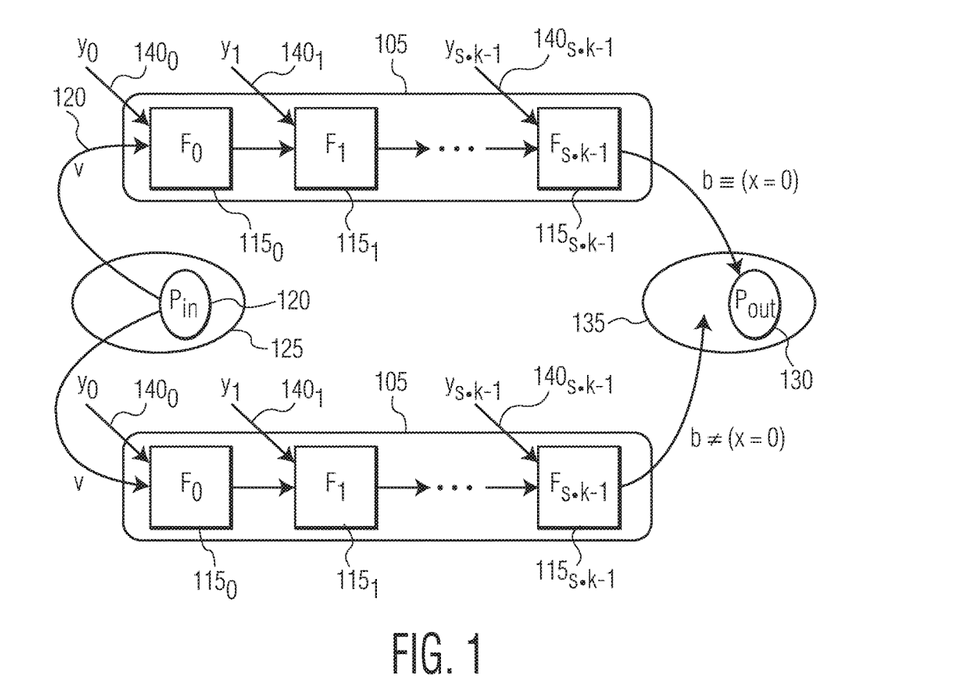
FIG. 1 describes a number of building blocks used to build an implementation of the embodiment.

The embodiment processes one chunk at a time. Note that there are s·k chunks in total. FIG. 1 describes a number of building blocks used to build an implementation of the embodiment. First, the s·k chunks are ordered into the sequence $y_0, y_1, \ldots, y_{s \cdot k-1}$. That is, this sequence is just a permutation of the values $x_{i,j}$.

Next, a sequence of affine mappings $F_0, \ldots, F_{s \cdot k-1}$ is defined. Function $F_i$ has 2 inputs: chunk $y_i$ and the output of the previous function $F_{i-1}$. For i=0, there is no previous function. In that case, the second input is given by a value v that has some known property $P_{in}$ (in the embodiment, this property is that the first bit is set to 1, but it can also be something different). The property $P_{in}$ 120 is a subset of an input space 125 as shown in FIG. 1. Function $F_i$ is bijective in its second input. That is, if we fix the first input to any value, we obtain a bijective function.

The function sequence $F_0, \ldots, F_{s \cdot k-1}$ is such that for some linear property $P_{out}$, it holds that the final outcome satisfies this property if and only if the value x associated with the s·k chunks equals 0. Being linear means that $P_{out}(w_0 \oplus w_1) = P_{out}(w_0) \oplus P_{out}(w_1)$. The complete functionality of the chain is denoted by F.

Usage

It a goal to have an implementation of the check x=0 that has no first-order leakage. That is, intermediate results may not leak information on x. If the secret sharing is performed well, this is already the case for the chunks $y_i$. That is, x does not correlate with any value $y_i$.

Assume that F is linear, i.e., the constant part of this affine function is 0. Then embodiment may proceed as follows. The value $v_i$ may be randomly split into t shares $v_0, v_1, \ldots, v_{t-1}$. Hence, $v = \oplus_i v_i$.

In FIG. 1 the chain 105 is shown. The chain 105 includes the function sequence $F_0, \ldots, F_{s \cdot k-1}$ (115$_0$, 115$_1$, ... 115$_{s \cdot k-1}$) where each function $F_i$ has 2 inputs: chunk $y_i$ 140, and the output of the previous function $F_{i-1}$. The chain 105 is repeatedly applied to all the shares $v_i$ of v separately. That is, the chain 105 is executed t times, where the executions only differ in their v-input so that execution i has the input $v_i$.

Let $b_i = P_{out}(F(y_0, \ldots, y_{s \cdot k-1}, v_i))$ indicate whether the outcome of the ith chain satisfies property $P_{out}$ 130. The property $P_{out}$ 130 is shown in FIG. 1 as a subset of the output space 135. Because of the linearity of F and of this property $P_{out}$, the following holds: $\oplus_i b_i = \oplus_i P_{out}(F(y_0, \ldots, y_{s \cdot k-1}, v_i)) = P_{out}(F(y_0, \ldots, y_{s \cdot k-1}, \oplus_i v_i)) = P_{out}(F(y_0, \ldots, y_{s \cdot k-1}, v)) = (x=0)$. Hence, the values $b_i$ define a valid secret sharing for the expression x=0.

This implementation does not have any first-order leakage as follows from the following two observations: 1) the value $v_i$ does not leak any information because v is split randomly; and 2) since $F_0$ is bijective in its v-value input, the output of this function can also be considered to be a random number.

In FIG. 1, an input value v is selected having the input property $P_{in}$ 120. The input value v is then split into shares $v_i$. Each of the shares $v_i$ is input to the chain 105. Then if a combination outputs of the chain (e.g., XORing all of the outputs of the chain) have the output property $P_{out}$, then the value x represented by the split chunks $y_0, y_1, \ldots, y_{s \cdot k-1}$ is indeed equal to zero, i.e., x=0. This situation is illustrated in the top chain 105. The output of the bottom chain 105 is shown as not having the output property $P_{out}$, so in this case $x \neq 0$.

In the above description, F was assumed to be linear. However, in the set-up, it was indicated F may be affine. In that case, the constant part of F may be split over the t executions. For instance, the first execution with share $v_0$ may be based on F and the other executions on only the linear part of F. Alternatively, t may be selected to be odd, in which case all of the constants from F add up to the constant from F because t−1 additions cancel out to zero.

Implementation

Figure 2:
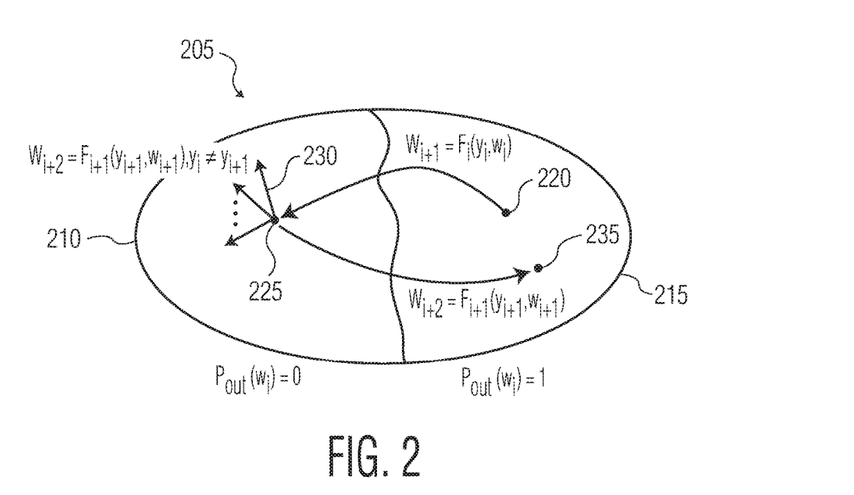
FIG. 2 illustrates an implementation of chains using two shares.

Above, general description of an embodiment was provided. Now a more detailed implementation how chains as visualized in FIG. 1 may be obtained will be described. FIG. 2 illustrates an implementation of chains using two shares.

First the chunks are ordered by first placing the first chunk of all shares, then placing the second chunk of all shares, and so on until the last chunk of all of the shares is placed last. Hence, $y_0, y_1, \ldots, y_{s \cdot k-1} = (x_{0,0}, x_{1,0}, \ldots, x_{s-1,0}, x_{0,1}, x_{1,1}, \ldots, x_{s-1,k-1})$.

Let W 205 be the range of each function $F_i$ as shown in FIG. 2. Then, this set is split into two parts 210 and 215 as shown in FIG. 2. For set 215 the property $P_{out}$ is true, and for set 210 $P_{out}$ not true. A value may be termed feasible if the property is satisfied. Otherwise, the value is termed infeasible.

Initially, the implementation starts with a feasible value v. Then, via the functions $F_i$, the chain of functions travels through the space W in the following way, where $w_i$ refers to the input of function $F_i$ which is also the output of $F_{i-1}$:

If x=0, then $w_i$ is feasible if and only if i is divisible by s. That is, if and only if an equal number of chunks for each share have been processed.

If x≠0 and if l is the first chunk for which the shares do not sum up to 0, then $w_i$ is feasible if and only if $i \in \{0, s, 2s, \ldots, l \cdot s\}$ is divisible by s. That is, from the moment the chunks at a given position in the shares do not sum up to 0, the outputs of the $F_i$ remain in the infeasible part of the space W.

FIG. 2 illustrates this processing of the chunks by the chain. The idea is as follows. The set of solutions is partitioned into two parts: a feasible part and an infeasible part. Then, the chunks are processed one after each other. The chunks are ordered such that the following is true: x=0 if and only if the first pair of chunks are the same, the second pair of chunks are the same, the third pair of chunks are the same, and so on. Now, if x=0, then each pair starts from a feasible solution. Then, after processing each pair of chunks, the result returns to a feasible solution if and only if the two chunks in the pair are the same. If the result does not return to a feasible solution (because the chunks are not the same), then the following processing of chunks can never return to a feasible solution. That is, once a result falls in the infeasible part of the solution space the following results remain in the infeasible part of the solutions space (i.e. there will be no way back).

This is illustrated as follows. At a point $w_i$ 220 in the set 215 where $P_{out}$ is true the function $F_i$ is evaluated to calculate $w_{i+i}$ 225. The point $w_{i+i}$ 225 is in the set 210 where $P_{out}$ is not true. Now, $F_{i+1}$ is evaluated to calculate $w_{i+2}$. If $y_i = y_{i+i}$, then $P_{out}(w_{i+2})=1$ (i.e., $P_{out}$ is true), and the point $w_{i+2}$ 235 is in the set 215. If $y_i \neq y_{i+1}$, then $P_{out}(w_{i+2})=0$ (i.e., $P_{out}$ is not true), and the point $w_{i+2}$ 230 is in the set 210. When this happens, further calculations $F_i$ in the chain will result in points $w_i$ that all are in the set 210 which indicated that the input x≠0.

Now another embodiment will be described showing how to implement the following if-statement (P)

if (x=0) then $$z=z \oplus C_1$$

else $$z=z \oplus C_2$$

in such a way that all input, intermediate, and output values are protected against first order DRA attacks via secret sharing with two shares. This means that the input is given by $x_0$ and $x_1$ with $x=x_0 \oplus x_1$ and the output by $z_0$ and $z_1$ with $z=z_0 \oplus z_1$.

Using two shares, i.e., for t=2 gives $b_0, b_1$ with $b_0 \oplus b_1 \equiv (x_0 \oplus x_1 = 0)$. Before showing how this can be done, observe that using $b_0, b_1$, P may be implemented as follows:

$$z_0 = z_0 \oplus C_2 \oplus b_0 \cdot (C_1 \oplus C_2)$$

$$z_1 = z_1 \oplus b_1 \cdot (C_1 \oplus C_2)$$

These expressions have the desired property that all input, intermediate, and output values are protected via secret sharing.

So, what remains is showing how the embodiments described above may be applied to compute $b_0, b_1$ from $x_0, x_1$. For this embodiment, let x, and thus also the shares $x_0, x_1$, be bytes. Furthermore, these values may be split into two chunks of 4 bits, which means k=2 and $D_0 = D_1 = \{0,1\}^4$. This embodiment will match the amount of detail given in FIG. 2. Hence, this means that $P_{in} = P_{out}$ and that a W, $v \in W$, $P_{out}$, and functions $F_i$ are needed This may be defined as follows:

$W=\{0,1\}^{33}$ contains all 33-bit long binary strings.

$v=e_0$, where $e_j$ denotes the identity vector with a 1 on position j and a 0 on all other positions. Hence, v is given by a one followed by 32 zeros, $e_1$ start 01 followed by 31 zeros, etc.

$P_{out}$ is the property that the first bit is set to 1. Obviously, $P_{out}(v)=1$.

$F_0 = \text{swap}(0, x_{0,0}+1)$, $F_1 = \text{swap}(0, x_{1,0}+1)$, $F_2 = \text{swap}(0, x_{0,1}+17)$, $F_3 = \text{swap}(0, x_{1,1}+17)$, where swap (i, j) is the functions that swaps bits i and j. These functions are clearly affine. In fact, they are even linear. The following notation is used where $x_{i,j}$ refers to a binary bitstring as well as to refer to the value represented by this binary bitstring.

It will now be shown that for this definition that $P_{out}(F(v))=1$ if and only if x=0, i.e., the first bit of the outcome equals 1 if and only if $x_{0,0} \oplus x_{1,0} = 0$ and $x_{0,1} \oplus x_{1,1} = 0$. Remember that F denotes the complete function including $F_0, \ldots, F_3$.

It can be verified that $$F_1(x_{1,0}, F_0(x_{0,0}, e_0)) = \begin{cases} e_0 & \text{if } x_{0,0} = x_{1,0} \\ e_{x_{0,0}+1} & \text{if } x_{0,0} \neq x_{1,0} \end{cases}.$$

Hence, the only bit that is set remains at the first position if $x_{0,0} = x_{1,0}$, otherwise this one-bit goes to position $x_{0,0}+1$, which is a value between 1 and 16 since a chunk is a 4-bit value.

Similarly, the following holds:

$$F_3(x_{1,1}, F_2(x_{0,1}, e_j)) = \begin{cases} e_j & \text{if } x_{0,1} = x_{1,1} \wedge j = 0 \\ e_{x_{0,1}+17} & \text{if } x_{0,1} \neq x_{1,1} \wedge j = 0 \\ e_j & 0 < j \leq 16 \end{cases}$$

Combining these results yields $$F(x_{0,0}, x_{1,0}, x_{0,1}, x_{1,1}, e_0) = \begin{cases} e_0 & \text{if } x_{0,0} = x_{1,0} \wedge x_{0,1} = x_{1,1} \\ e_{x_{0,0}+1} & \text{if } x_{0,0} \neq x_{1,0} \\ e_{x_{0,1}+17} & \text{if } x_{0,0} = x_{1,0} \wedge x_{0,1} \neq x_{1,1} \end{cases}$$

Hence, the only scenario in which the first bit of the outcome, as returned by the function F equals 1 is if $x_{0,0}=x_{1,0}$ and $x_{0,1}=x_{1,1}$, i.e., if x=0. This is the sought for goal.

The last steps of the implementation are to split v into t=2 shares $v_0$, $v_1$ with $v=v_0 \oplus v_1$ and to compute $$b_0 = F(x_{0,0}, x_{1,0}, x_{0,1}, x_{1,1}, v_0)$$

$$b_1 = F(z_{0,0}, x_{1,0}, x_{0,1}, x_{1,1}, v_1)$$

This completes the implementation. In this embodiment, the functions $F_0, \ldots, F_3$ swap a bit 1 back and forth between different positions of the chunks $x_{i,j}$. This is equivalent to calculating points and moving back forth between the two sets 210 and 215 in FIG. 2. When x=0 the final result is a result in the set 215 where $P_{out}$ is true. When x≠0 the final result is a result in the set 210 where $P_{out}$ is not true. This will occur because the bit 1 at some point is not swapped back to the first bit position of x as should happen. Once this happens, it cannot be swapped back to the first bit position because of the properties of the functions $F_0, \ldots, F_3$.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 3:
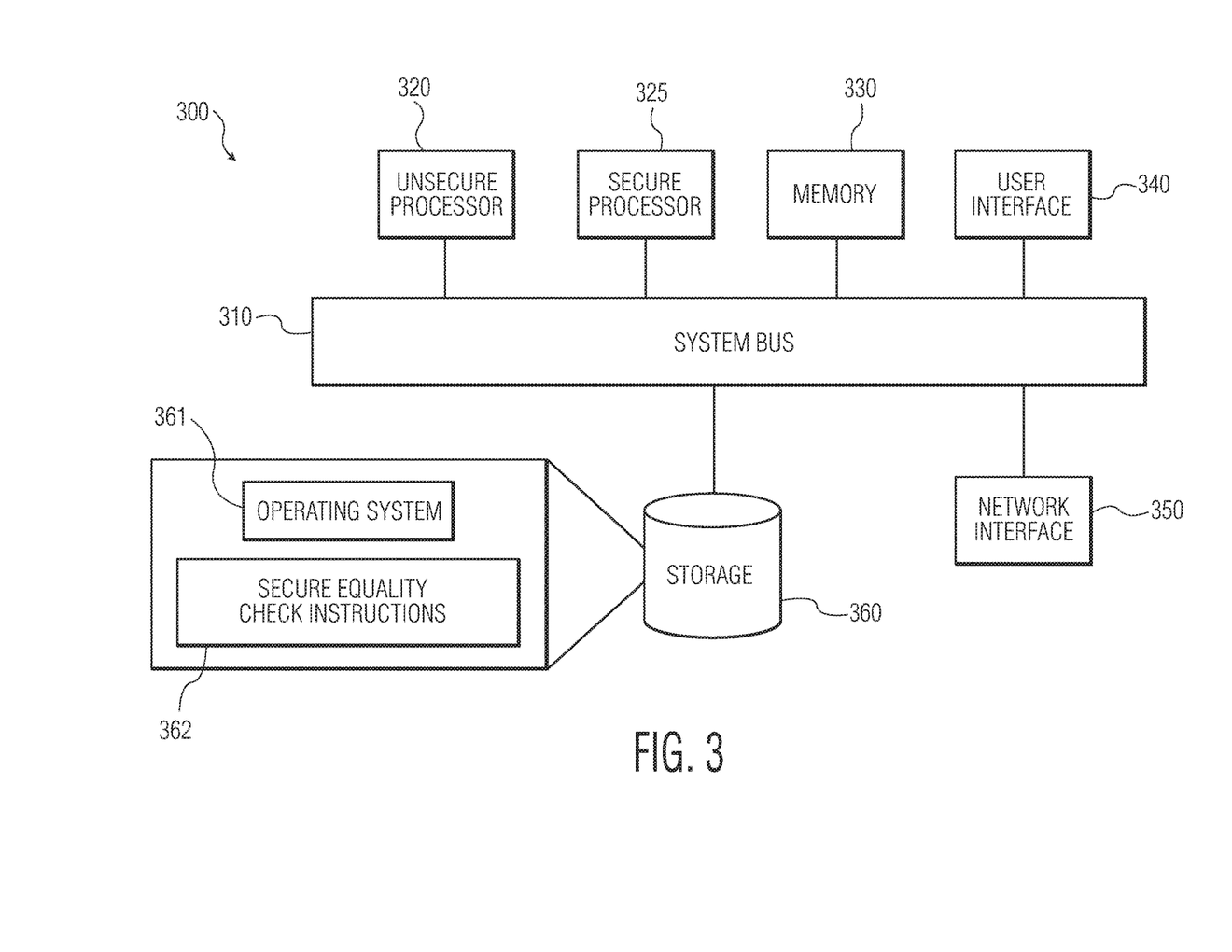
FIG. 3 illustrates an exemplary hardware diagram for implementing an equality check.

FIG. 3 illustrates an exemplary hardware diagram 300 for implementing an equality check as described above. As shown, the device 300 includes an unsecured processor device 320, secured processor device 325, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The unsecured processor device 320 may be any hardware device capable of executing instructions stored in memory 330 or storage 360 or otherwise processing data. Such an unsecured processor device 320 may execute software for implementing the equality check. As such, the unsecured processor 320 may include a microprocessor, field programmable gate array (FPGA), application-specific integrated circuit (ASIC), or other similar devices.

The secured processor device 325 may be any hardware device capable of executing instructions stored in secure memory or storage that is part of the secured processor device or otherwise processing data. Such a secured processor device 325 may execute software for implementing the equality check. As such, the secured processor 325 may include a microprocessor, field programmable gate array (FPGA), application-specific integrated circuit (ASIC), or other similar devices. It contemplated that a white-box implementation of the embodiments above may implement the secure equality check on the unsecured processor device 320, and that a grey-box implementation of the embodiments above may implement the secure equality check on the secured processor device 325.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the unsecured processor device 320 or data upon with the unsecured processor device 320 operate. For example, the storage 360 may store a base operating system 361 for controlling various basic operations of the hardware 300. Further, the storage 360 may include secure equality check instructions 362 that carry out the steps of the secure equality check by unsecured processor device 320 described above.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the host device 300 is shown as including one of each described component, the various components may be duplicated in various embodiments. For example, the unsecured processor device 320 may include multiple microprocessors that are configured to independently execute the methods described herein or are configured to perform steps or subroutines of the methods described herein such that the multiple processors cooperate to achieve the functionality described herein. Likewise, the secured processor device 325 may include multiple microprocessors that are configured to independently execute the methods described herein or are configured to perform steps or subroutines of the methods described herein such that the multiple processors cooperate to achieve the functionality described herein.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of performing an equality check in a secure system, comprising:
   receiving an input v having a known input property specifying a value at a specific bit location;
   splitting the input v into t secret shares $v_i$ where i is an integer index and t is greater than 1;
   splitting an input x into k secret shares $x_i$ where i is a second integer index, k is greater than 1 and x is a non-linear expression;
   splitting the secret shares $x_i$ into s chunks resulting in s·k chunks $y_j$ where j is a third integer index;
   calculating a mapping chain t times for each secret share $v_i$, wherein the mapping chain includes s·k affine mappings $F_j$, wherein $y_j$ and $F_{j-1}(y_{j-1})$ are inputs to the affine mappings F and each of the affine mappings F produces an output to generate outputs of the affine mappings, wherein the affine mappings F are swap functions that swap positions of two bits of integer indices i of $v_j$ and $x_j$ and the integer index j, and wherein $F_0(y_0)=v_i$; and
   verifying whether the outputs satisfy the known input property of v in order to confirm that the secret shares of x were not leaked and that resistance of the secure system to a differential relation analysis attack has been increased.

2. The method of claim 1, wherein the input x equals a constant.

3. The method of claim 1, wherein the input v is split such that $v=\oplus_i v_i$.

4. The method of claim 1, wherein the affine mappings $F_j$ are linear mappings.

5. The method of claim 1, wherein the known input property is that the input v in binary form has a 1 at a first specific bit location.

6. The method of claim 5, wherein the known output property is that a combination of the outputs in binary form has a 1 at a second specific bit location.

7. The method of claim 1, wherein the secure system is a white-box cryptographic system.

8. The method of claim 7, wherein the white-box cryptographic system is implemented using obfuscated lookup tables.

9. The method of claim 1, wherein the secure system is a grey-box cryptographic system.

10. A non-transitory machine-readable storage medium encoded with instructions for performing an equality check by a secure system, the non-transitory machine-readable storage medium, comprising:
    instructions for receiving an input v having a known input property specifying a value at a specific bit location;
    instructions for splitting the input v into t secret shares $v_i$ where i is an integer index and t is greater than 1;
    instructions for splitting an input x into k secret shares $x_i$ where i is a second integer index, k is greater than 1 and x is a non-linear expression;
    instructions for splitting the secret shares $x_i$ into s chunks resulting in s·k chunks $y_j$ where j is a third integer index;
    instructions for calculating a mapping chain t times for each secret share $v_i$, wherein the mapping chain includes s·k affine mappings $F_j$, wherein $y_j$ and $F_{j-1}(y_{j-1})$ are inputs to the affine mappings F and each of the affine mappings F produces an output to generate outputs of the affine mappings, wherein the affine mappings F are swap functions that swap positions of two bits of integer indices i of $v_j$ and $x_j$ and the integer index j, and wherein $F_0(y_0)=v_i$; and
    instructions for verifying whether the outputs satisfy the known input property of v in order to confirm that the secret shares of x were not leaked and that resistance of the secure system to a differential relation analysis attack has been increased.

11. The non-transitory machine-readable storage medium of claim 10, wherein the input x equals a constant.

12. The non-transitory machine-readable storage medium of claim 10, wherein the input v is split such that $v=\oplus_i v_i$.

13. The non-transitory machine-readable storage medium of claim 10, wherein the affine mappings $F_j$ are linear mappings.

14. The non-transitory machine-readable storage medium of claim 10, wherein the known input property is that the input v in binary form has a 1 at a first specific bit location.

15. The non-transitory machine-readable storage medium of claim 14, wherein the known output property is that a combination of the outputs in binary form has a 1 at a second specific bit location.

16. The non-transitory machine-readable storage medium of claim 10, wherein the secure system is a white-box cryptographic system.

17. The non-transitory machine-readable storage medium of claim 16, wherein the white-box cryptographic system is implemented using obfuscated lookup tables.

18. The non-transitory machine-readable storage medium of claim 10, wherein the secure system is a grey-box cryptographic system.

* * * * *